United States Patent
Todaka et al.

(10) Patent No.: US 12,393,380 B2
(45) Date of Patent: Aug. 19, 2025

(54) PRINTING APPARATUS AND METHOD FOR CONTROLLING PRINTING APPARATUS

(71) Applicant: SEIKO EPSON CORPORATION, Tokyo (JP)

(72) Inventors: Shingo Todaka, Matsumoto (JP); Ryota Kondo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/407,144

(22) Filed: Jan. 8, 2024

(65) Prior Publication Data
US 2024/0231717 A1    Jul. 11, 2024

(30) Foreign Application Priority Data

Jan. 10, 2023    (JP) .................................. 2023-001528

(51) Int. Cl.
G06F 3/12    (2006.01)
(52) U.S. Cl.
CPC .......... *G06F 3/1236* (2013.01); *G06F 3/1208* (2013.01)
(58) Field of Classification Search
None
See application file for complete search history.

(56) References Cited

U.S. PATENT DOCUMENTS

| 6,198,985 B1* | 3/2001 | Miyasaka | G06F 3/1229 358/1.15 |
| 2003/0137676 A1* | 7/2003 | Seike | H04N 1/2369 358/1.2 |
| 2013/0050384 A1* | 2/2013 | Sugimoto | B41J 11/66 347/218 |
| 2014/0253660 A1* | 9/2014 | Amano | B41J 15/046 347/218 |
| 2021/0362520 A1* | 11/2021 | Sakaguchi | B41J 11/663 |

FOREIGN PATENT DOCUMENTS

JP    2017-138811 A    8/2017

* cited by examiner

*Primary Examiner* — Darryl V Dottin
(74) *Attorney, Agent, or Firm* — WORKMAN NYDEGGER

(57) ABSTRACT

Provided is a printing apparatus including a communication section configured to communicate with an external apparatus and receive print data and a cut command, a connector configured to be coupled to any one of a first peripheral apparatus and a second peripheral apparatus, a head, a cutter, and a control section configured to control the head and the cutter, in which the control section is configured to, when receiving, by the communication section, reception information including a plurality of pieces of the print data and a plurality of the cut commands after no reception for a predetermined period of time, transmit a drive command to the first peripheral apparatus via the connector based on at least one cut command among the cut commands included in the reception information to drive the first peripheral apparatus, and not transmit the drive command to the first peripheral apparatus based on another cut command.

8 Claims, 10 Drawing Sheets

PRINTING APPARATUS AND METHOD FOR CONTROLLING PRINTING APPARATUS

The present application is based on, and claims priority from JP Application Serial Number 2023-001528, filed Jan. 10, 2023, the disclosure of which is hereby incorporated by reference herein in its entirety.

BACKGROUND

1. Technical Field

The present disclosure relates to a printing apparatus and a method for controlling a printing apparatus.

2. Related Art

Printers that output a signal from an interface for a cash drawer to a notification apparatus to cause a buzzer to ring when issuing a slip are known.

However, since a printer described in JP-A-2017-138811 causes a buzzer to ring every time a slip is issued, some staff members may feel annoyed.

SUMMARY

According to an aspect of the present disclosure, there is provided a printing apparatus including a communication section configured to communicate with an external apparatus and receive print data and a cut command, a connector configured to be coupled to any one of a first peripheral apparatus and a second peripheral apparatus, a head configured to print the print data on recording paper, a cutter configured to cut the recording paper based on the cut command, and a control section configured to control the head and the cutter, in which the control section is configured to, when receiving, by the communication section, reception information including a plurality of pieces of the print data and a plurality of the cut commands after no reception for a predetermined period of time, transmit a drive command to the first peripheral apparatus via the connector based on at least one cut command among the cut commands included in the reception information to drive the first peripheral apparatus, and not transmit the drive command to the first peripheral apparatus based on another cut command.

According to another aspect of the present disclosure, there is provided a method for controlling a printing apparatus, the apparatus including: a communication section configured to communicate with an external apparatus and receive print data and a cut command, a connector configured to be coupled to a first peripheral apparatus, a head configured to print the print data on recording paper, and a cutter configured to cut the recording paper based on the cut command, the method including: when receiving, by the communication section, reception information including a plurality of pieces of the print data and a plurality of the cut commands after no reception for a predetermined period of time, transmitting a drive command to the first peripheral apparatus via the connector based on one cut command among the cut commands included in the reception information to drive the first peripheral apparatus, and not transmitting the drive command to the first peripheral apparatus based on another cut command.

DESCRIPTION OF EXEMPLARY EMBODIMENTS

Figure 1:
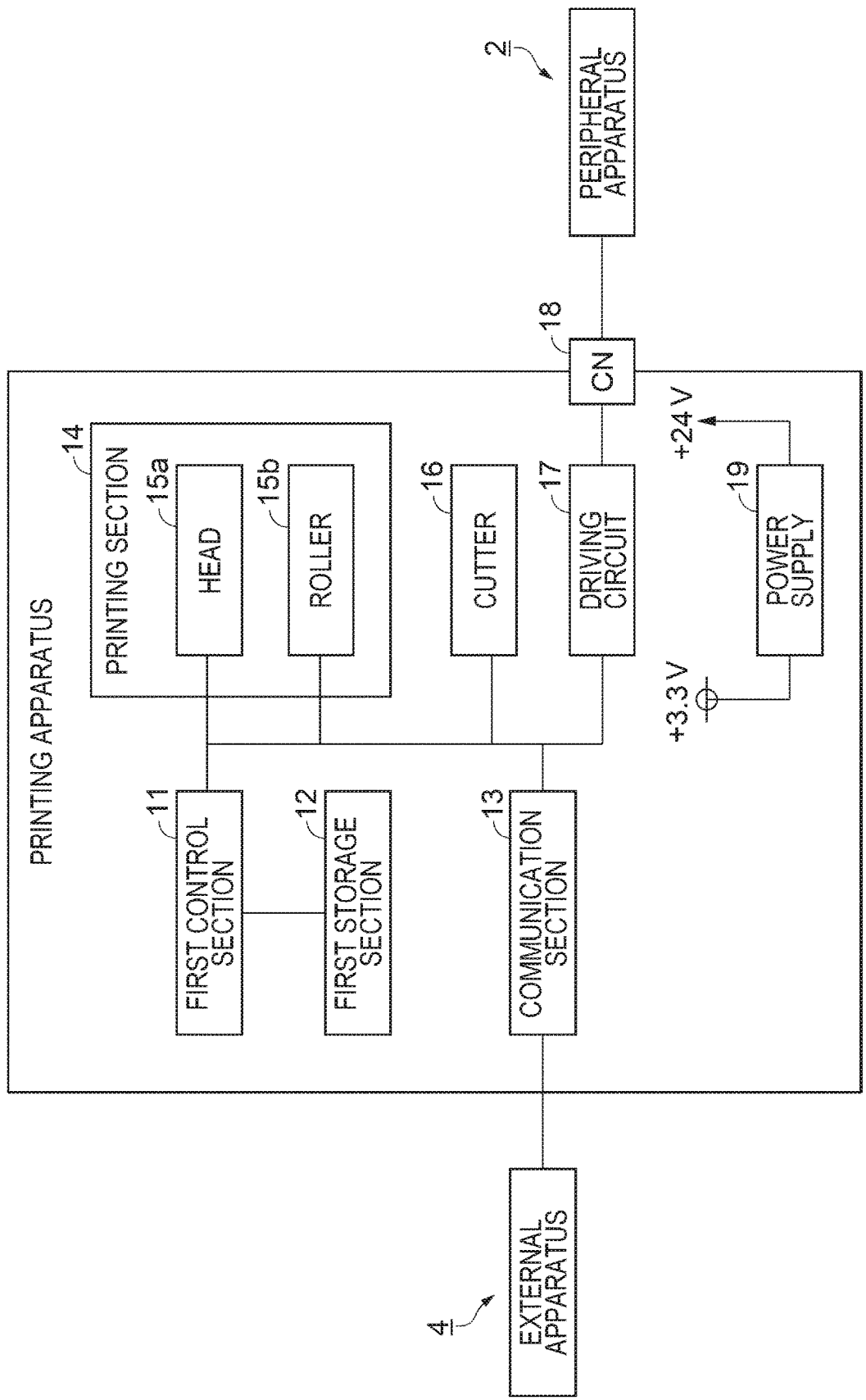
FIG. 1 is a block diagram illustrating a configuration of a printing apparatus to which a first peripheral apparatus is coupled.

1. Embodiment 1-1. Printing Apparatus to which First Peripheral Apparatus is Coupled As illustrated in FIG. 1, a printing apparatus 1 includes a first control section 11, a first storage section 12, a communication section 13, a printing section 14 including a head 15a and a roller 15b, a cutter 16, a driving circuit 17, a connector CN 18, and a power supply 19. In the following description, the connector CN 18 is simply referred to as a CN 18.

The printing apparatus 1 can be coupled to a first peripheral apparatus 2 via the CN 18, and can communicate with an external apparatus 4 via the communication section 13. The printing apparatus 1 according to the embodiment is used in, for example, a point of sale (POS) system.

The first control section 11 includes a central processing unit (CPU) that integrally controls the sections of the printing apparatus 1, a universal asynchronous receiver transmitter (UART) that manages input and output, a field programmable gate array (FPGA) or a programmable logic device (PLD) that is a logic circuit, and the like. The CPU is also referred to as a processor.

The first storage section 12 includes a flash read only memory (ROM) or a hard disk drive (HDD) which is a rewritable nonvolatile memory, a random access memory (RAM) which is a volatile memory, and the like.

The CPU of the first control section 11 reads a program such as firmware and setting information stored in the nonvolatile memory of the first storage section 12, and executes the program by using the RAM of the first storage section 12 as a work area.

The printing section 14 includes the head 15a and the roller 15b. Recording paper PA to be described later is, for example, a long thermal paper. The head 15a is, for example, a line thermal head. The first control section 11 rotates the roller 15*b* to transport the recording paper PA, and drives the head 15*a* to perform printing on the recording paper PA.

The cutter 16 has a movable cutting blade. The first control section 11 moves the cutting blade to cut the recording paper PA. The printed and cut recording paper PA is issued as a receipt to be given to a customer in a store, a slip instructing cooking in a kitchen of a restaurant, or the like.

The first control section 11 can adjust a distance of movement with respect to a movable range of the cutting blade of the cutter 16.

Accordingly, the first control section 11 can perform so-called full-cut in which the cutting blade is sufficiently moved with respect to the movable range to completely cut and separate the recording paper PA. In addition, the first control section 11 can perform so-called partial cut in which the cutting blade is moved to the middle of the movable range to partially cut the recording paper PA.

The fully cut receipt is in a form that can be easily handed to the customer by the staff. On the other hand, since the partially cut slip is partially linked to the long recording paper PA, the slip does not fall from the printing apparatus 1, and even when the staff does not take out the slip, the slip does not fall on the floor of the kitchen and is not scattered.

The communication section 13 includes a circuit, a substrate, or the like that can communicate with the external apparatus 4 such as a computer or a tablet terminal. The communication section 13 may have, for example, a connector, and may conform to a Universal Serial Bus (USB) which is a wired serial communication method. In addition, the communication section 13 may have, for example, an antenna, and may conform to Ethernet ((registered trademark), IEEE802.3) which is a wireless network communication method.

As described later, when the first control section 11 receives print data via the communication section 13, the first control section 11 controls the head 15*a* and the roller 15*b* of the printing section 14 to perform printing on the recording paper PA.

When the first control section 11 receives a cut command via the communication section 13, the first control section 11 controls the cutter 16 to cut the recording paper PA.

The CN 18 is, for example, a modular jack having six poles, and is a connector so-called RJ-11. The CN 18 can be coupled to any one of the first peripheral apparatus 2 and a second peripheral apparatus 3 described later.

As will be described later, the driving circuit 17 can transmit and receive predetermined information or signals to and from the first peripheral apparatus 2 via the CN 18. The driving circuit 17 is the same for the second peripheral apparatus 3.

The first peripheral apparatus 2 can operate by receiving supply of electric power from the printing apparatus 1 via the CN 18. The same applies to the second peripheral apparatus 3.

The power supply 19 can generate and output a voltage of, for example, substantially +24 V or substantially +3.3 V. Hereinafter, +24 V will be simply referred to as 24 V, and +3.3 V will be simply referred to as 3.3 V. Further, when a current or a voltage is represented, "substantially" is omitted.

The power supply 19 can supply 24 V so as to drive so-called actuators such as the printing section 14 including the head 15*a* and the roller 15*b*, the cutter 16, and the driving circuit 17. In addition, the power supply 19 can supply 3.3 V to logic circuits such as the first control section 11, the first storage section 12, and the communication section 13.

Further, the power supply 19 can supply 24 V to the first peripheral apparatus 2 and the second peripheral apparatus 3 via the CN 18.

In the example illustrated in FIG. 1, the printing apparatus 1 is configured to issue a slip instructing cooking in the kitchen. In this case, the first peripheral apparatus 2 may be, for example, a ringing apparatus having a function of ringing. The printing apparatus 1 can cause the first peripheral apparatus 2 to ring, which is driving.

By the ringing of the first peripheral apparatus 2, it is possible to notify the staff that the printing apparatus 1 issued a slip. In this way, by configuring the first peripheral apparatus 2 to ring by using the printing apparatus 1 that issues a slip, the staff can easily notice that a slip was issued. The staff can immediately take out the slip from the printing apparatus 1 and perform cooking. At this time, the printing apparatus 1 may partially cut the slip.

Figure 2:
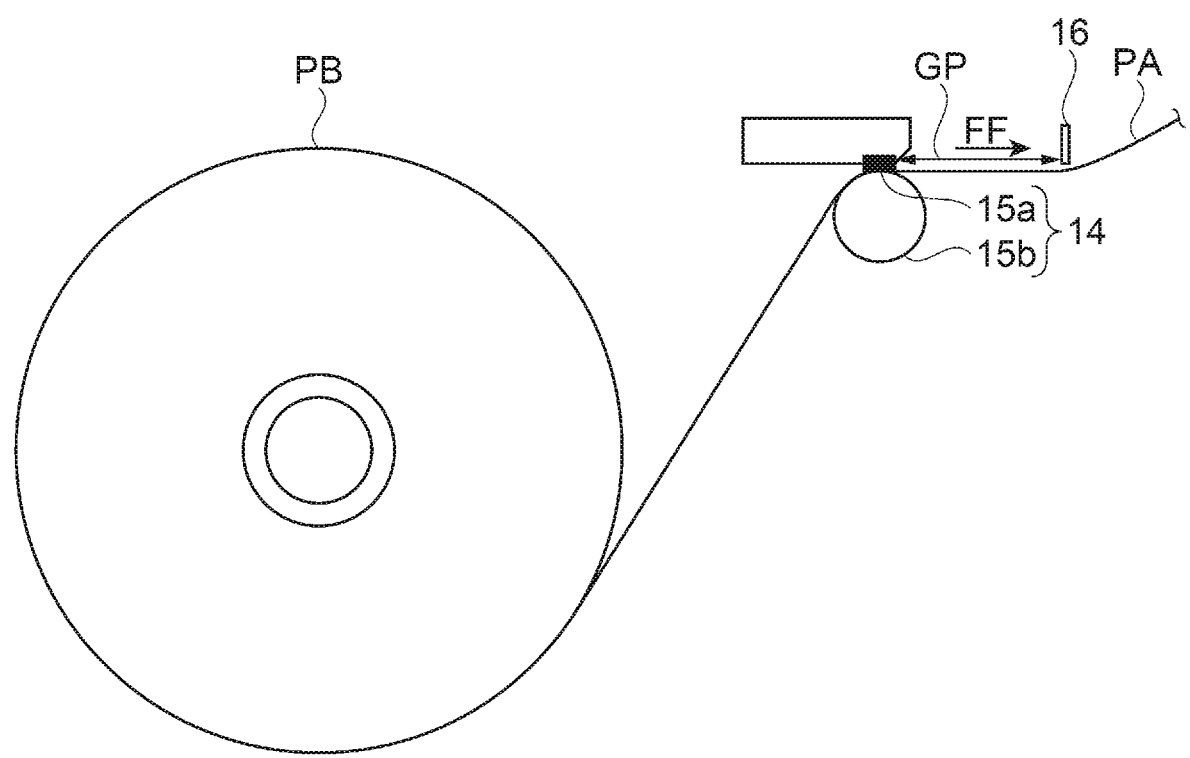
FIG. 2 is a schematic diagram illustrating a configuration of a main portion of the printing apparatus.

FIG. 2 illustrates an arrangement of the head 15*a* and the roller 15*b* of the printing section 14, the cutter 16, and the like. The long recording paper PA is wound as roll paper PB. The roller 15*b* is located at a position facing the head 15*a* via the recording paper PA, and is also referred to as a platen.

The recording paper PA is pinched between the head 15*a* and the roller 15*b*. Under the control of the first control section 11, the roller 15*b* pulls out the recording paper PA from the roll paper PB and transports the recording paper PA in a transport direction FF.

The head 15*a*, the roller 15*b*, and the cutter 16 are disposed from upstream to downstream in the transport direction FF. The position of the head 15*a* and the position of the cutter 16 are separated from each other by a distance of a gap GP along the transport direction FF.

Due to the gap GP, the recording paper PA printed by the head 15*a* needs to be cut after being transported to the position of the cutter 16. This is because when the printed recording paper PA is cut without being transported to the position of the cutter 16, the printed recording paper PA is cut at a position in the middle thereof and no longer functions as the receipt or slip.

Next, a configuration in which the printing apparatus 1 drives the first peripheral apparatus 2 will be described with reference to FIG. 3. For convenience of description, the driving circuit 17 and the CN 18 are mainly illustrated on the printing apparatus 1 side.

The printing apparatus 1 is coupled to the first peripheral apparatus 2 by a modular cable or the like via the CN 18.

The first peripheral apparatus 2 includes a second control section 21, a second storage section 22, a buzzer 23, and a voltage converter 24. Similarly to the first control section 11, the second control section 21 includes a CPU and the like, and similarly to the first storage section 12, the second storage section 22 includes a nonvolatile memory, a volatile memory, and the like.

The second storage section 22 may be incorporated in the second control section 21. The buzzer 23 may also be incorporated in the second control section 21.

The voltage converter 24 of the first peripheral apparatus 2 can convert 24 V supplied from the printing apparatus 1 into 3.3 V and supply 3.3 V to the second control section 21, the second storage section 22, and the like, which are logic circuits.

When the buzzer 23 is driven by 3.3 V, the buzzer 23 is configured to receive supply of 3.3 V from the voltage converter 24. In addition, when the buzzer 23 is driven by 24 V, the buzzer 23 is configured to receive supply of 24 V from the printing apparatus 1. When the second control section 21, the second storage section 22, and the like are also driven by 24 V, the voltage converter 24 may be omitted.

In this way, the first peripheral apparatus 2 can be driven by receiving the supply of electric power from the printing apparatus 1.

The first control section 11 of the printing apparatus 1 has output ports P1 and P2, and has an input port IN.

The second control section 21 of the first peripheral apparatus 2 has output ports OUT and S, and input ports R and CLK. The second control section 21 can output a ringing signal from the output port OUT to the buzzer 23 to cause the buzzer 23 to ring.

The driving circuit 17 of the printing apparatus 1 has transistors TR1 and TR2. The transistors TR1 and TR2 can be driven by 24 V.

A base of the transistor TR1 and a base of the transistor TR2 are respectively coupled to the output ports P1 and P2 of the first control section 11. The first control section 11 outputs a Clock signal from the output port P2, and outputs predetermined information as a Data signal from the output port P1 in synchronization with the Clock signal.

The Data signal and the Clock signal respectively input to the base of the transistor TR1 and the base of the transistor TR2 are amplified by using 24 V, and are transmitted from respective collectors to the first peripheral apparatus 2 via the CN 18.

The Data signal includes a drive command, and when the first peripheral apparatus 2 is a ringing apparatus, the Data signal includes a ringing command.

The CN 18 is a connector having terminals of six poles, and the terminals are numbered 1 to 6.

A terminal 1 of the CN 18 is coupled to respective grounds of the printing apparatus 1 and the first peripheral apparatus 2 to adjust a potential.

A terminal 2 of the CN 18 transmits the amplified Data signal from the printing apparatus 1 to the first peripheral apparatus 2. At this time, a terminal 5 of the CN 18 transmits the amplified Clock signal synchronized with the Data signal from the printing apparatus 1 to the first peripheral apparatus 2.

A terminal 3 of the CN 18 transmits a status signal from the output port S of the first peripheral apparatus 2 to the printing apparatus 1. The status signal is input to the input port IN of the first control section 11. The status signal is, for example, a signal indicating that the buzzer 23 is ringing. The first control section 11 can determine that the buzzer 23 is ringing based on the status signal input to the input port IN.

A terminal 4 of the CN 18 supplies 24 V from the printing apparatus 1 to the first peripheral apparatus 2. A terminal 6 of the CN 18 couples the ground of the printing apparatus 1 and a ground port G of the second control section 21 of the first peripheral apparatus 2 to match ground levels of the both.

The second control section 21 of the first peripheral apparatus 2 receives the Data signal and the Clock signal transmitted from the printing apparatus 1 from the input ports R and CLK respectively. The second control section 21 can receive the Data signal from the input port R in accordance with the timing of the Clock signal received from the input port CLK, and can acquire a ringing command from the Data signal. As described above, the printing apparatus 1 and the first peripheral apparatus 2 can perform so-called serial communication in which communication is performed in synchronization with the Clock signal.

The second control section 21 can generate a ringing signal based on the acquired ringing command and output the ringing signal from the output port OUT to the buzzer 23 to cause the buzzer 23 to ring.

The first peripheral apparatus 2 may convert the Data signal and the Clock signal into 3.3 V by using the voltage converter 24.

1-2. Method for Controlling Printing Apparatus to Which First Peripheral Apparatus is Coupled Next, a method for controlling printing, cutting, and driving of the first peripheral apparatus 2 by the printing apparatus 1 will be described with reference to FIGS. 4 and 5. The first peripheral apparatus 2 coupled to the printing apparatus 1 is, for example, a ringing apparatus.

First, it is assumed that order information of a series of dishes is input to the external apparatus 4. In accordance with the order information of the series of dishes, the external apparatus 4 generates a series of pieces of print data including "Cooking A0 . . . A9" that is print data A instructing cooking A, "Cooking B0 . . . B9" that is print data B instructing cooking B, "Cooking C0 . . . C9" that is print data C instructing cooking C, and "Cooking D0 . . . D9" that is print data D instructing cooking D. Then, the external apparatus 4 adds cut commands to respective pieces of print data and generates transaction information.

Here, the transaction information indicates information related to a series of processes. In the embodiment, the transaction information includes a plurality of pieces of print data and a plurality of cut commands described above.

The external apparatus 4 collectively transmits the transaction information to the printing apparatus 1 in order to perform a series of processes for instructing cooking. The printing apparatus 1 collectively receives the transaction information by the communication section 13. The transaction information received by the printing apparatus 1 is referred to as reception information.

Figure 4:
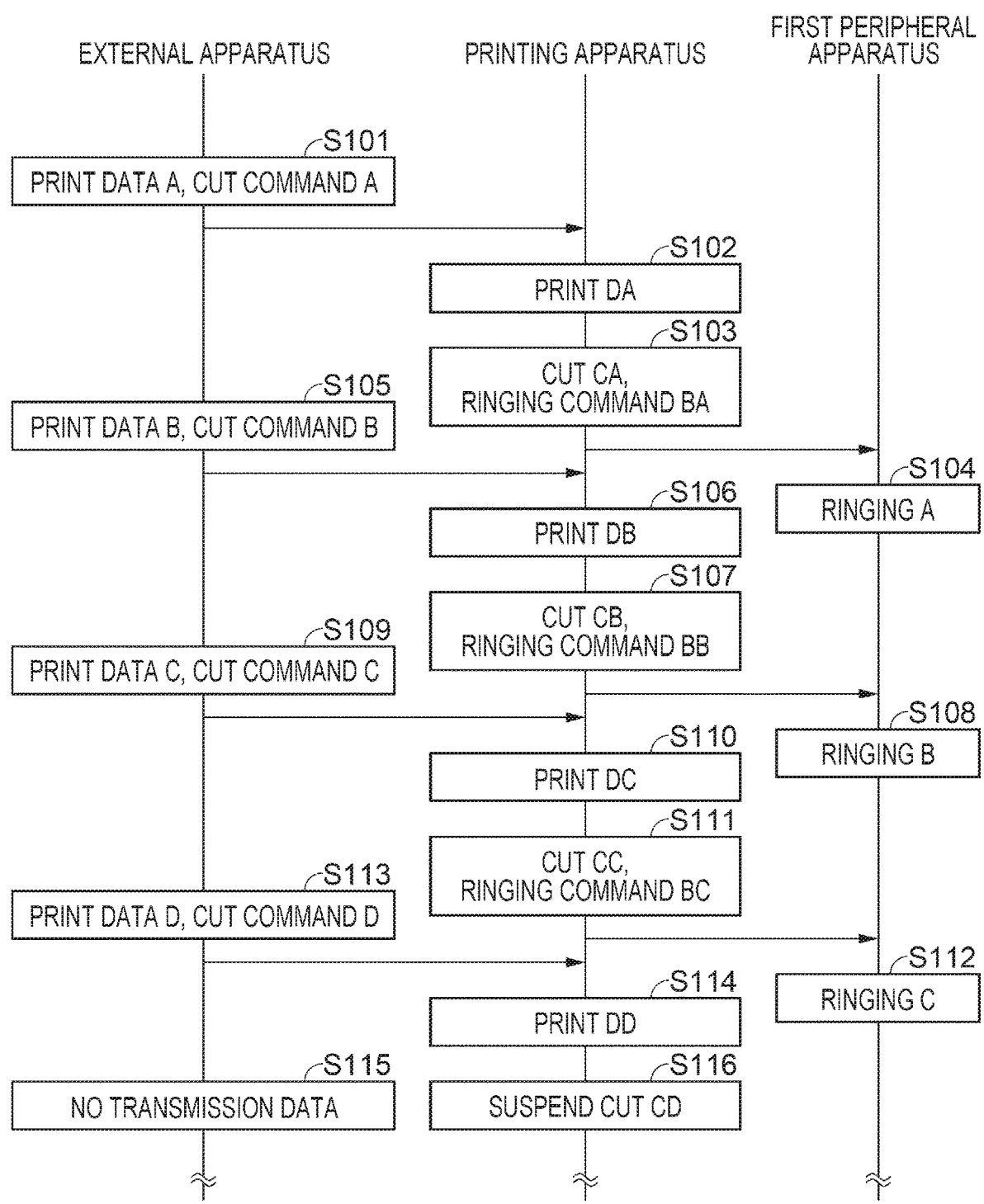
FIG. 4 is a state transition diagram illustrating a method for controlling the printing apparatus when reception information including a plurality of pieces of print data and a plurality of cut commands is received.

For specific description in FIG. 4, it is assumed that the external apparatus 4 sequentially transmits the plurality of pieces of print data and the plurality of cut commands included in the transaction information in the above-described order. Further, it is assumed that the printing apparatus 1 sequentially receives the plurality of pieces of print data and the plurality of cut commands included in the reception information in the above-described order.

As illustrated in FIG. 4, first, the external apparatus 4 transmits the print data A and a cut command A included in the transaction information to the printing apparatus 1 (S101).

The first control section 11 of the printing apparatus 1 receives the print data A by the communication section 13, and executes print DA for printing the print data A on the recording paper PA by the printing section 14 (S102).

Next, the first control section 11 receives the cut command A by the communication section 13, and executes cut CA for cutting the recording paper PA with the cutter 16 (S103). At this time, the first control section 11 generates a ringing command BA in conjunction with the execution of the cut CA and transmits the ringing command BA to the first peripheral apparatus 2 via the CN 18 (S103).

The second control section 21 of the first peripheral apparatus 2 receives the ringing command BA via the CN 18, and executes ringing A for causing the buzzer 23 to ring (S104).

As described above, the first control section 11 of the printing apparatus 1 generates the ringing command BA in conjunction with the execution of the cut CA, and transmits the ringing command BA to the first peripheral apparatus 2 to execute the ringing A. Therefore, the external apparatus 4 does not need to transmit a command corresponding to the ringing command BA to the printing apparatus 1.

Similarly, next, the external apparatus 4 transmits the print data B and a cut command B to the printing apparatus 1 (S105). The first control section 11 of the printing apparatus 1 executes print DB for printing the received print data B by the printing section 14 (S106).

Next, the first control section 11 executes cut CB by the cutter 16 based on the received cut command B (S107). At this time, the first control section 11 generates a ringing command BB in conjunction with the execution of the cut CB and transmits the ringing command BB to the first peripheral apparatus 2 (S107).

The second control section 21 of the first peripheral apparatus 2 executes ringing B for causing the buzzer 23 to ring based on the received ringing command BB (S108).

Similarly, next, the external apparatus 4 transmits the print data C and a cut command C to the printing apparatus 1 (S109). The first control section 11 of the printing apparatus 1 executes print DC for printing the received print data C by the printing section 14 (S110).

Next, the first control section 11 executes cut CC by the cutter 16 based on the received cut command C (S111). At this time, the first control section 11 generates a ringing command BC in conjunction with the execution of the cut CC and transmits the ringing command BC to the first peripheral apparatus 2 (S111).

The second control section 21 of the first peripheral apparatus 2 executes ringing C for causing the buzzer 23 to ring based on the received ringing command BC (S112).

Next, the external apparatus 4 transmits the print data D and a cut command D to the printing apparatus 1 (S113). The first control section 11 of the printing apparatus 1 executes print DD for printing the received print data D by the printing section 14 (S114).

Here, since the transmission of the transaction information is completed, the external apparatus 4 enters a no-transmission-data state (S115).

When the first control section 11 detects that there is no next reception in the communication section 13 and there is no reception information, the first control section 11 temporarily suspends execution of cut CD based on the last cut command D of the received reception information (S116). In addition, the first control section 11 does not transmit a ringing command BD, which is supposed to be in conjunction with the execution of the cut CD, to the first peripheral apparatus 2. The cut command D is the last cut command included in the reception information.

Figure 5:
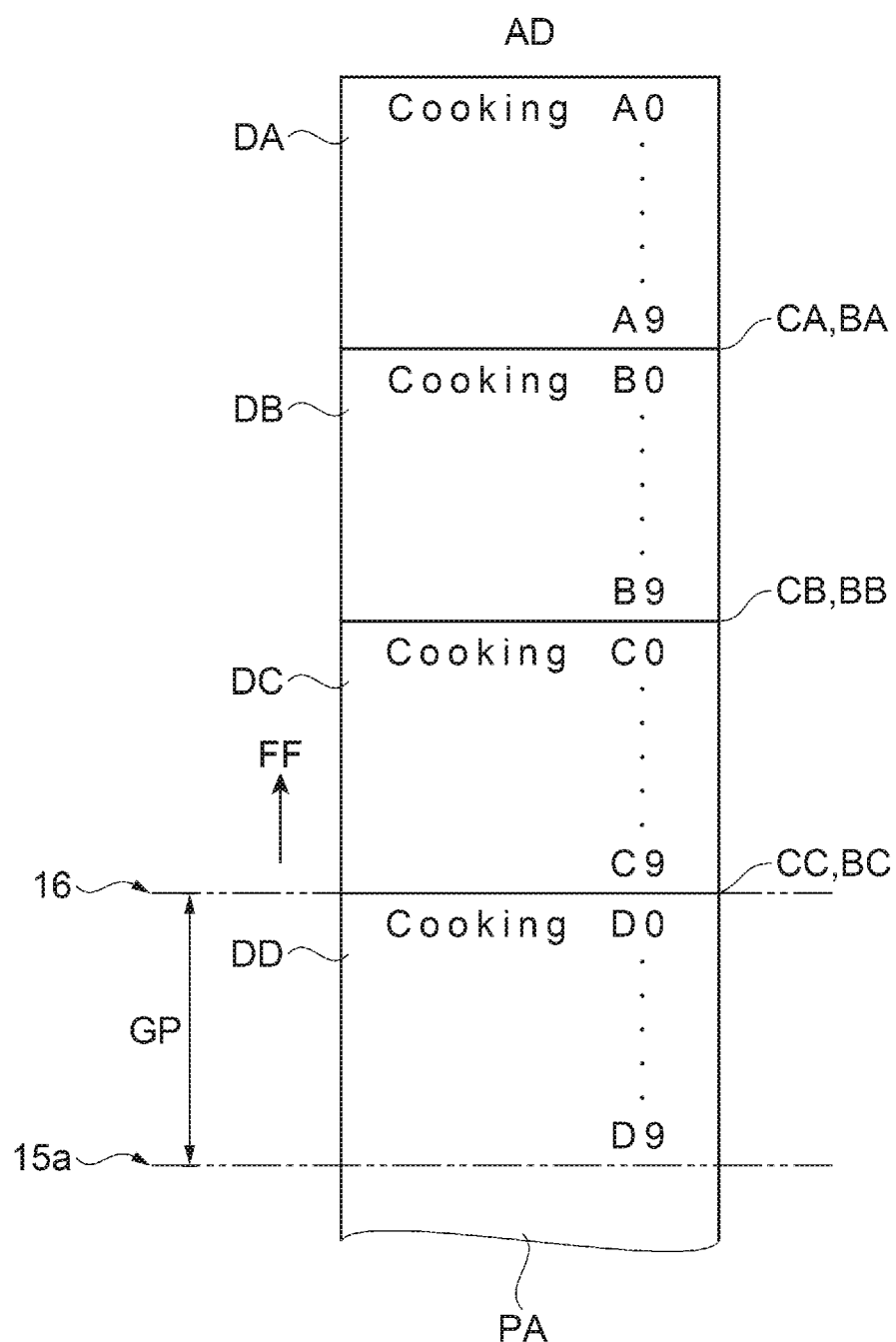
FIG. 5 is a schematic diagram illustrating a print result when the method for controlling the printing apparatus according to FIG. 4 is executed.

As illustrated in FIG. 2, there is a gap GP between the head 15a and the cutter 16. For this reason, when the first control section 11 executes the print DD, as illustrated in FIG. 5 to be described later, a print result DD printed on the recording paper PA is not transported to the position of the cutter 16. When the cut CD is executed in this state and the recording paper PA is cut, the recording paper PA is cut at a position in the middle of the print result DD.

Therefore, when the first control section 11 detects that there is no next reception information, the first control section 11 suspends the execution of the cut CD.

FIG. 5 illustrates a print result AD on the recording paper PA obtained by executing the method for controlling the printing apparatus 1 illustrated in FIG. 4. FIG. 5 illustrates that the staff does not take out the slip and the print result AD remains in the printing apparatus 1. The cutter 16 is located at a position shifted from the head 15a in the transport direction FF. A distance between them is the gap GP.

In FIG. 5, for example, a result obtained by executing and printing the print DA related to "Cooking A0 . . . A9" that is the print data A on the recording paper PA is illustrated as a print result DA. Hereinafter, similarly, a print result DB to a print result DD are illustrated.

Further, for example, a cut result obtained by executing the cut CA on the recording paper PA is illustrated as a cut result CA in FIG. 5. Hereinafter, similarly, a cut result CB to a cut result CC are illustrated.

Further, for example, the transmission of the ringing command BA in conjunction with the cut CA and ringing are illustrated as ringing command transmission BA in FIG. 5 at the position of the cut result CA for convenience. Hereinafter, similarly, ringing command transmission BB to ringing command transmission BC are illustrated.

As illustrated in FIG. 5, since there is a gap GP between the head 15a and the cutter 16, the position of the print result DD does not exceed the position of the cutter 16 after the first control section 11 executes the print DD.

Therefore, after executing the print DD, the first control section 11 suspends the execution of the cut CD corresponding to the received cut command D. The first control section 11 also suspends the transmission of the ringing command BD. In the reception information, the print data D is the last print data, and the cut command D is the last cut command.

Figure 6:
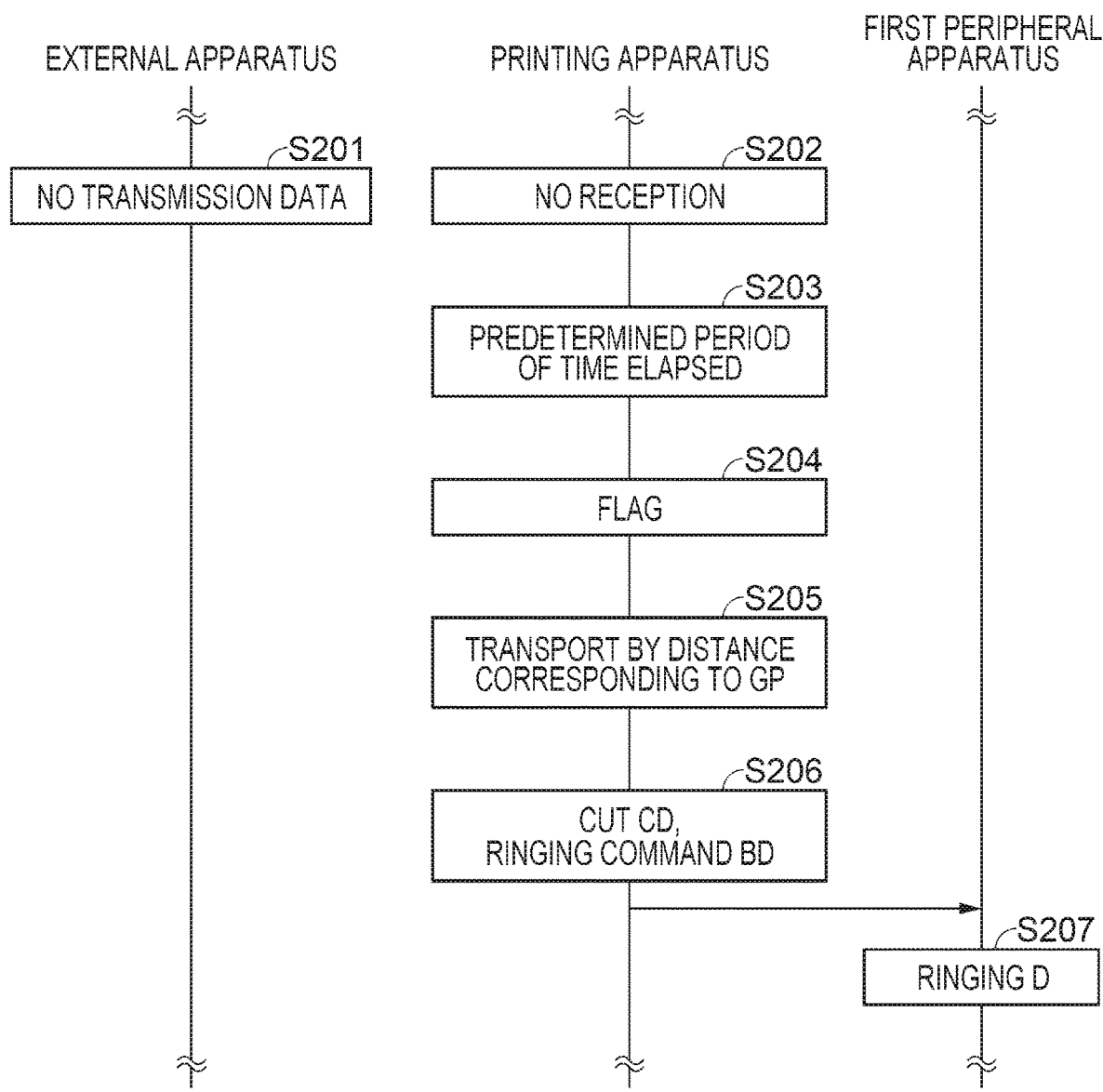
FIG. 6 is a state transition diagram illustrating the method for controlling the printing apparatus when there is no reception.

Next, as illustrated in FIG. 6, it is assumed that the order information of the next dish is not input to the external apparatus 4 and the no-transmission-data state continues (S201).

When the first control section 11 of the printing apparatus 1 determines that there is no next reception in the communication section 13, a state in which there is no reception information (S202) continues, and a predetermined period of time elapses (S203), the first control section 11 sets a flag (S204). The predetermined period of time is, for example, about two seconds.

At this time, the first control section 11 can determine that the transaction information, which is the reception information, comes to an end.

Here, the setting of the flag specifically indicates that the first control section 11 stores information indicating that the state in which there is no reception information continues and the predetermined period of time elapses in the first storage section 12.

For example, the first control section 11 writes a value of "1" as a flag in a predetermined area of the first storage section 12, where the value is "0" in an initial state.

When the first control section 11 reads the predetermined area of the first storage section 12 later and the value is "1", it is determined that the flag is set, and it can be determined that the state in which there is no reception information continues and the predetermined period of time elapses.

In addition, after the power supply 19 of the printing apparatus 1 is turned on, the first control section 11 may set the flag also when the first control section 11 determines that there is no reception in the communication section 13, a state in which there is no reception information continues, and a predetermined period of time elapses.

That is, in this case, the first control section 11 does not receive the reception information including the print data A to the print data D, the cut commands, and the like in advance. The first control section 11 may set the flag and perform a process in the same manner as described later when there is no reception in the communication section 13 and a predetermined period of time elapses even though the reception information is not received in advance.

The first control section 11 causes the roller 15b to transport the recording paper PA in the transport direction FF by a distance corresponding to the gap GP which is a predetermined distance (S205).

Figure 7:
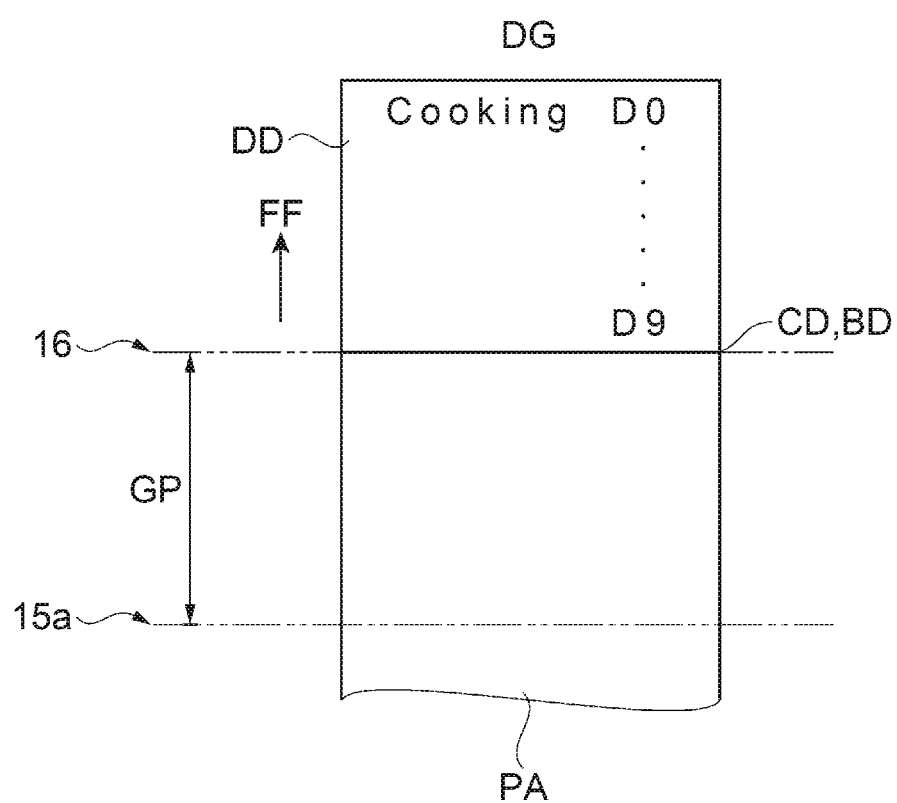
FIG. 7 is a schematic diagram illustrating a print result when the method for controlling the printing apparatus according to FIG. 6 is executed.

This result is illustrated as a print result DG in FIG. 7. The position of the print result DD on the recording paper PA can exceed the position of the cutter 16. In this case, since it is sufficient that the position of the print result DD exceeds the position of the cutter 16, the first control section 11 may transport the recording paper PA by the distance of the gap GP or more. In FIG. 7, only the print result DD is illustrated for convenience.

Then, the first control section 11 executes the suspended cut CD (S206). As illustrated in FIG. 7, the print result DD is cut at a position that exceeds the position of the cutter 16, and becomes a cut result CD. The print result DD can be issued in a form of a slip without being cut in the middle.

At this time, the first control section 11 transmits the suspended ringing command BD to the first peripheral apparatus 2 in conjunction with the execution of the cut CD (S206), and causes the first peripheral apparatus 2 to execute ringing D (S207). The cut result CD and ringing command transmission BD are illustrated at the position of the cutter 16 in FIG. 7.

The staff can ascertain that the print DD was issued by the ringing D of the first peripheral apparatus 2, and can take out the cut print result DD from the printing apparatus 1.

At this time, the area of the gap GP on the recording paper PA becomes a not-printed blank area due to the transport. The first control section 11 may cause the printing section 14 to print a message indicating that the transaction information comes to an end, instead of generating a blank by transporting the recording paper PA by the distance of the gap GP.

Figure 8:
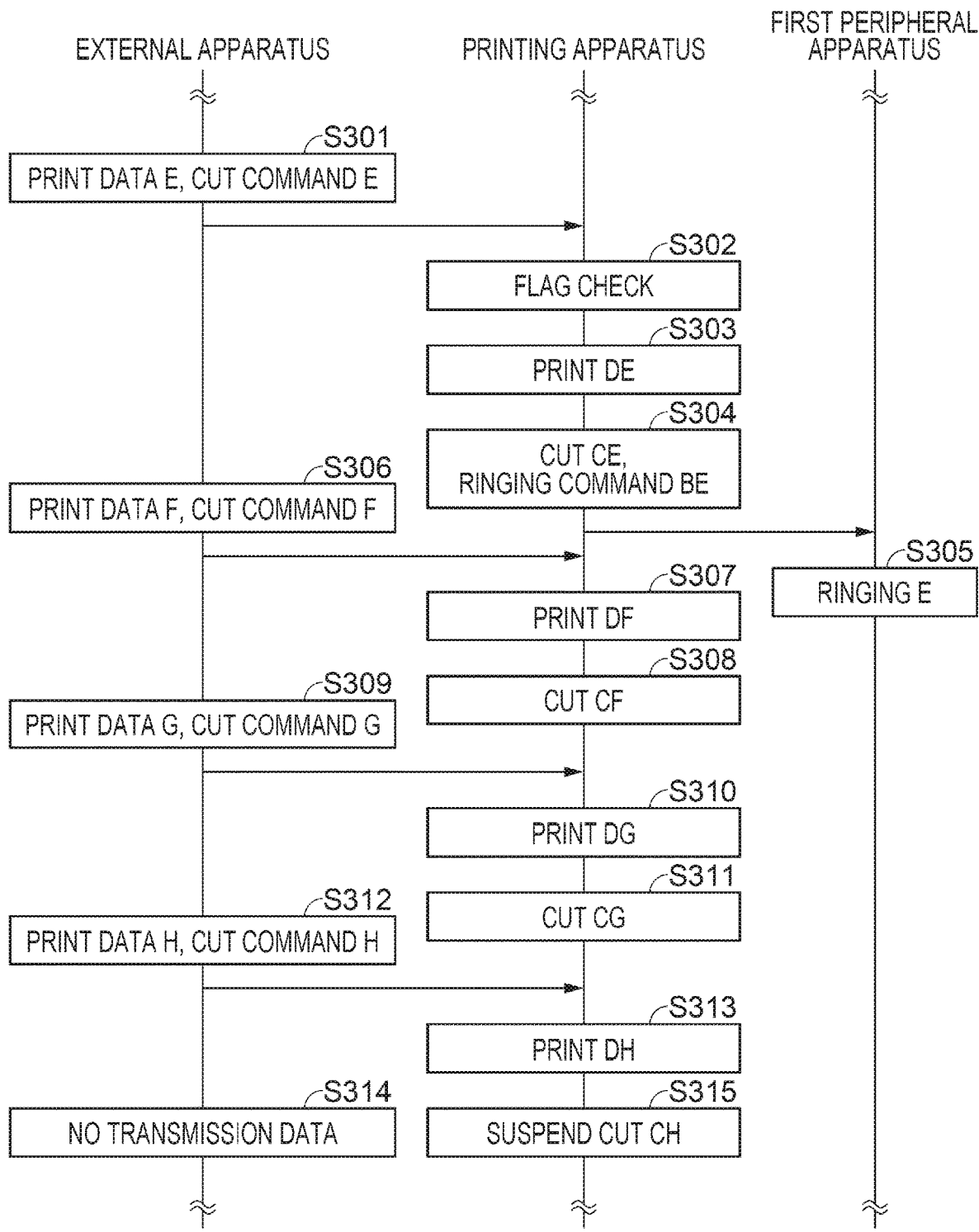
FIG. 8 is a state transition diagram illustrating a method for controlling the printing apparatus when next reception information is received after there is no reception.

Next, it is assumed that order information of the next series of dishes is input to the external apparatus 4. As illustrated in FIG. 8, according to the order information of the next series of dishes, the external apparatus 4 generates respective pieces of print data of "Cooking E0 . . . E9" that is print data E instructing cooking E, "Cooking F0 . . . F9" that is print data F instructing cooking F, "Cooking G0 . . . G9" that is print data G instructing cooking G, and "Cooking H0 . . . H9" that is print data H instructing cooking H. Then, the external apparatus 4 adds cut commands to the respective pieces of print data to generate next transaction information.

As in the case of FIG. 4 described above, the external apparatus 4 transmits the next transaction information to the printing apparatus 1 also in the case of FIG. 8. The printing apparatus 1 receives next reception information, which is the next transaction information, by the communication section 13.

Also in FIG. 8, for specific description, it is assumed that the external apparatus 4 sequentially transmits the plurality of pieces of print data and the plurality of cut commands included in the next reception information in the above-described order.

In addition, it is assumed that the printing apparatus 1 sequentially receives and processes the plurality of pieces of print data and the plurality of cut commands included in the next reception information in the above-described order.

As illustrated in FIG. 8, the external apparatus 4 transmits the first print data E and a cut command E included in the next transaction information to the printing apparatus 1 (S301).

The first control section 11 of the printing apparatus 1 receives the print data E and the cut command E by the communication section 13.

At this time, the first control section 11 reads the value in the predetermined area of the first storage section 12 in which the flag is written. The first control section 11 executes a flag check for checking whether the value is "1" indicating that the flag is set (S302). When the first control section 11 reads the value of "1" indicating that a flag is set, the first control section 11 determines that the state in which there is no reception information continues and the predetermined period of time elapses.

As a result of the determination, the first control section 11 transmits a ringing command to the first peripheral apparatus 2 via the CN 18 based on at least one cut command included in the next reception information, and executes a process of ringing. The first control section 11 does not transmit the ringing command to the first peripheral apparatus 2 based on another cut command included in the next reception information.

In this example, it is assumed that the first control section 11 determines that one cut command is the cut command E which is the first cut command included in the next reception information and processes the cut command. Further, the first control section 11 determines that a cut command other than the cut command E is another cut command.

When the first control section 11 reads a value of "0" indicating that the flag is not set, the first control section 11 determines that the state in which there is no reception information has not continued for the predetermined period of time. The first control section 11 can determine that the process illustrated in FIG. 6 is not performed.

In this case, after executing print DE of the first print data E included in the next reception information, the first control section 11 executes the suspended cut CD and the ringing command BD. Thereafter, the first control section 11 performs the same process as in the case of FIG. 4 described above based on the cut command included in the next reception information.

The description of the process when the flag is set will be continued. As illustrated in FIG. 8, the first control section 11 of the printing apparatus 1 receives the print data E by the communication section 13, and executes the print DE for printing the print data E on the recording paper PA by the printing section 14 (S303).

Next, the first control section 11 executes cut CE for cutting the recording paper PA with the cutter 16 based on the received cut command E (S304). At this time, the first control section 11 processes one cut command as the cut command E. Specifically, the first control section 11 generates a ringing command BE in conjunction with the execution of the cut CE, and transmits the ringing command BE to the first peripheral apparatus 2 via the CN 18 (S304).

The second control section 21 of the first peripheral apparatus 2 receives the ringing command BE via the CN 18, and executes ringing E for causing the buzzer 23 to ring (S305).

Next, the external apparatus 4 transmits the print data F and a cut command F to the printing apparatus 1 (S306). The first control section 11 of the printing apparatus 1 executes print DF for printing the received print data F by the printing section 14 (S307).

Next, the first control section 11 executes cut CF by the cutter 16 based on the received cut command F (S308). At this time, the first control section 11 determines that the cut command F is another cut command, and processes the cut command F. Specifically, the first control section 11 does not generate a ringing command in conjunction with the execution of the cut CF, and does not transmit a ringing command to the first peripheral apparatus 2 via the CN 18.

Next, the external apparatus 4 transmits the print data G and a cut command G to the printing apparatus 1 (S309). The first control section 11 of the printing apparatus 1 executes print DG for printing the received print data G by the printing section 14 (S310).

Next, the first control section 11 executes cut CG by the cutter 16 based on the received cut command G (S311). At this time, the first control section 11 determines that the cut command G is another cut command, does not generate a ringing command, and does not transmit a ringing command to the first peripheral apparatus 2.

Next, the external apparatus 4 transmits the print data H and a cut command H to the printing apparatus 1 (S312). The first control section 11 of the printing apparatus 1 executes print DH for printing the received print data H by the printing section 14 (S313).

Here, since the transmission of the transaction information is completed, the external apparatus 4 enters the no-transmission-data state (S314).

When the first control section 11 detects that there is no next reception in the communication section 13 and there is no reception information, the first control section 11 temporarily suspends execution of cut CH based on the received cut command H (S315). The cut command H is the last cut command included in the next reception information.

In this case, similarly to the case illustrated in FIG. 6, when there is no next reception and a predetermined period of time elapses, the first control section 11 executes the suspended cut CH after transporting the recording paper PA by the distance of the gap GP.

The first control section 11 determines that the cut command H is another cut command, does not generate a ringing command, and does not transmit a ringing command to the first peripheral apparatus 2 in the execution of the suspended cut CH.

At this time, the first control section 11 may generate a ringing command BH in conjunction with the execution of the cut CH, transmit the ringing command BH to the first peripheral apparatus 2, and cause the first peripheral apparatus 2 to ring.

Since the predetermined period of time elapses, the staff is less likely to feel annoyed. On the contrary, as in the case of the print result DD described above, the staff can ascertain that the print DH was issued, and can take out a cut print result DH from the printing apparatus 1.

Here, the first control section 11 sets one cut command as the cut command E which is the first cut command included in the reception information. The first control section 11 can assign a cut command in any order as one cut command. For example, the first control section 11 may set one cut command as the cut command F which is the second cut command included in the reception information. In addition, the first control section 11 may set one cut command as any combination of two or more cut commands included in the reception information.

In this way, when issuing a slip, the first control section 11 can cause the buzzer 23 of the first peripheral apparatus 2 to ring a specific number of times, such as once. The first control section 11 does not cause the buzzer 23 to ring every time a slip is issued, and can therefore prevent the staff from feeling annoyed.

Figure 9:
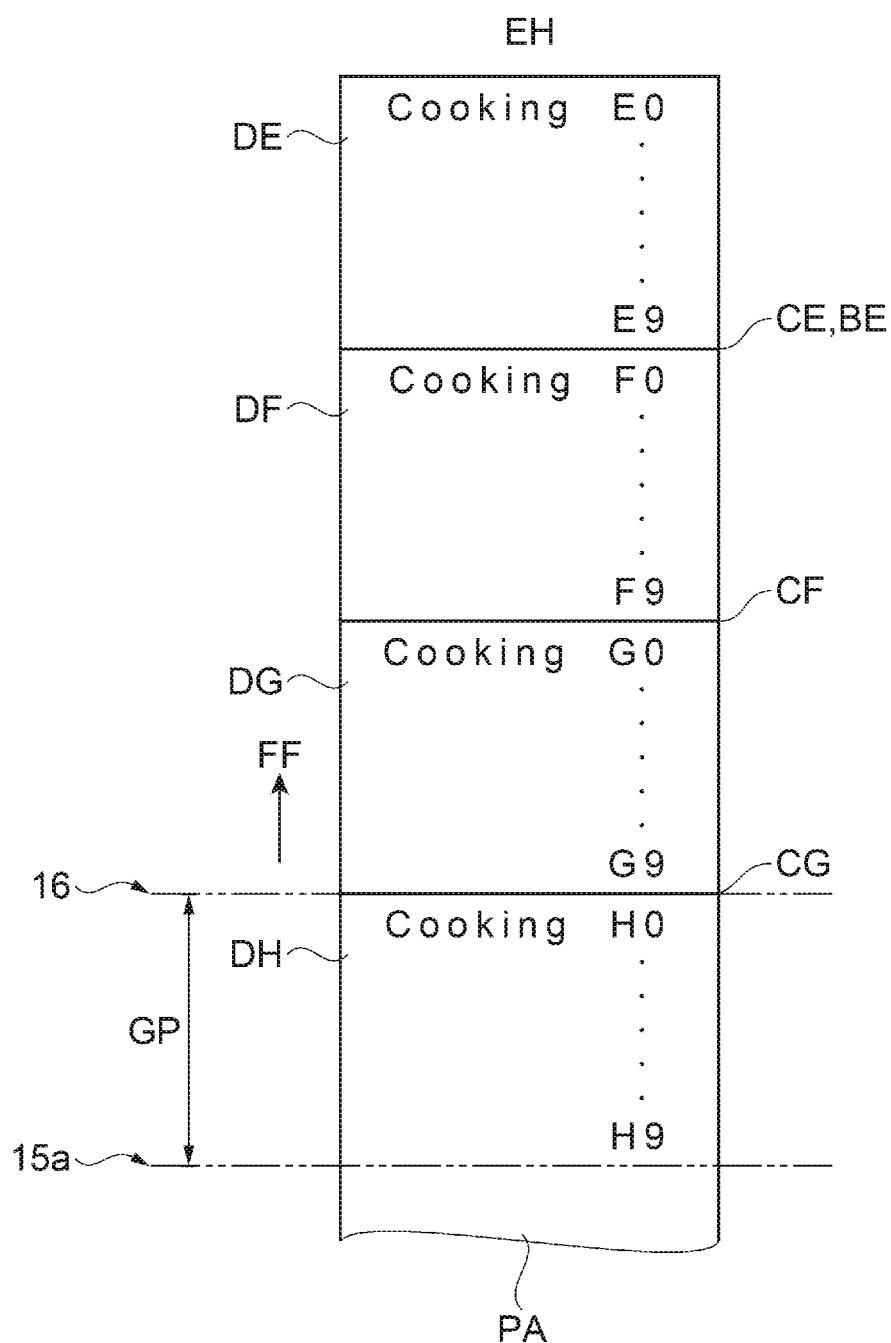
FIG. 9 is a schematic diagram illustrating a print result when the method for controlling the printing apparatus according to FIG. 8 is executed.

FIG. 9 illustrates a print result EH on the recording paper PA obtained by executing the method for controlling the printing apparatus 1 illustrated in FIG. 8 in the same manner as the print result AD illustrated in FIG. 5.

In FIG. 9, a result obtained by executing the print DE related to "Cooking E0 . . . E9" that is the print data E on the recording paper PA is illustrated as a print result DE. Hereinafter, similarly, a print result DF to a print result DH are illustrated.

In addition, a result obtained by executing the cut CE on the recording paper PA is illustrated as a cut result CE. Hereinafter, similarly, a cut result CF to a cut result CG are illustrated.

Further, the transmission of the ringing command BE is executed in conjunction with the execution of the cut CE corresponding to the cut command E which is one cut command. For convenience, this is illustrated as ringing command transmission BE at the position of the cut result CE. The ringing command transmission is not performed in the cut result CF and the cut result CG respectively corresponding to the cut command F that is another cut command and the cut command G that is another cut command.

Since there is a gap GP between the head 15a and the cutter 16, the position of the print result DH does not exceed the position of the cutter 16 after the first control section 11 executes the print DH.

As a result, after executing the print DH, the first control section 11 suspends execution of the cut CH corresponding to the received cut command H. When the cut command H is one cut command, the first control section 11 also suspends the transmission of the ringing command BH.

Here, an aspect of the ringing command will be described. As a first example of the ringing command, there is an aspect in which a waveform of a ringing signal for causing the buzzer 23 of the first peripheral apparatus 2 to ring is designated. Specifically, the ringing command includes information for designating an ON time and an OFF time for causing the buzzer 23 to ring. In this case, the ringing command may include information designating a number of times the ON time and the OFF time are repeated.

Based on the ringing command, the first control section 11 of the printing apparatus 1 generates a waveform related to the ON time and the OFF time for causing the buzzer 23 to ring as a Data signal which is the ringing command, and transmits the Data signal to the first peripheral apparatus 2. In this case, the first control section 11 may not output a Clock signal.

The first peripheral apparatus 2 can directly turn on and off the buzzer 23 according to the waveform of the received Data signal to drive, and cause the buzzer 23 to ring. In this case, the second control section 21 of the first peripheral apparatus 2 may not perform a process of generating a ringing signal. Further, the first peripheral apparatus 2 may not include the second control section 21.

In the first example of the ringing command, an aspect may be adopted in which the OFF time is fixed and the OFF time is not included.

As a second example of the ringing command, there is an aspect including scale information related to the ringing of the buzzer 23 of the first peripheral apparatus 2 and time information related to the ringing.

The first control section 11 of the printing apparatus 1 generates the scale information and the time information as a Data signal which is a ringing command, based on the ringing command, and transmits the Data signal to the first peripheral apparatus 2 in synchronization with a Clock signal.

In this case, the second storage section 22 of the first peripheral apparatus 2 stores in advance information of a drive signal corresponding to the scale information related to the ringing of the buzzer 23. The second control section 21 can read the information of the drive signal corresponding to the designated scale information from the second storage section 22 based on the received ringing command, generate a drive signal, and cause the buzzer 23 to ring according to a period of the designated time information.

In the second example of the ringing command, as compared with the first example of the ringing command, the first control section 11 of the printing apparatus 1 causes the buzzer 23 to ring, and thus it is not necessary to generate information of a complicated waveform. Furthermore, the first control section 11 does not need to continuously transmit the ringing command while the buzzer 23 is ringing. The first control section 11 can quickly end the process related to the ringing and execute the next process.

As a third example of the ringing command, there is an aspect including melody information related to the ringing of the buzzer 23 of the first peripheral apparatus 2. For example, the melody information includes information for designating a melody.

The first control section 11 of the printing apparatus 1 generates the melody information as a Data signal which is a ringing command based on the ringing command, and transmits the Data signal to the first peripheral apparatus 2 in synchronization with a Clock signal.

In this case, the second storage section 22 of the first peripheral apparatus 2 stores in advance detailed information corresponding to the melody information, such as a series of scales and times for causing the buzzer 23 to ring as the designated melody.

The second control section 21 can read the detailed information corresponding to the designated melody from the second storage section 22 based on the received ringing command, generate a drive signal, and cause the buzzer 23 to ring.

In the third example of the ringing command, as compared with the first example of the ringing command, the first control section 11 of the printing apparatus 1 does not need to generate information of a complicated waveform to cause the buzzer 23 to ring. Furthermore, the first control section 11 does not need to continuously transmit the ringing command while the buzzer 23 is ringing. The first control section 11 can quickly end the process related to the ringing and execute the next process.

Further, in the second example of the ringing command, when the first control section 11 of the printing apparatus 1 causes the buzzer 23 to ring a melody, the first control section 11 of the printing apparatus 1 needs to generate information for designating a series of scales and lengths related to the melody and transmit the information to the first peripheral apparatus 2.

In the third example of the ringing command, the first control section 11 only needs to designate a melody, and does not need to transmit information on a series of scales and times related to the melody. The first control section 11 can quickly end the process related to the ringing and execute the next process.

1-3. Printing Apparatus to Which Second Peripheral Apparatus is Coupled

A POS system may be provided with the second peripheral apparatus 3, which is a cash drawer for storing money or the like.

Figure 3:
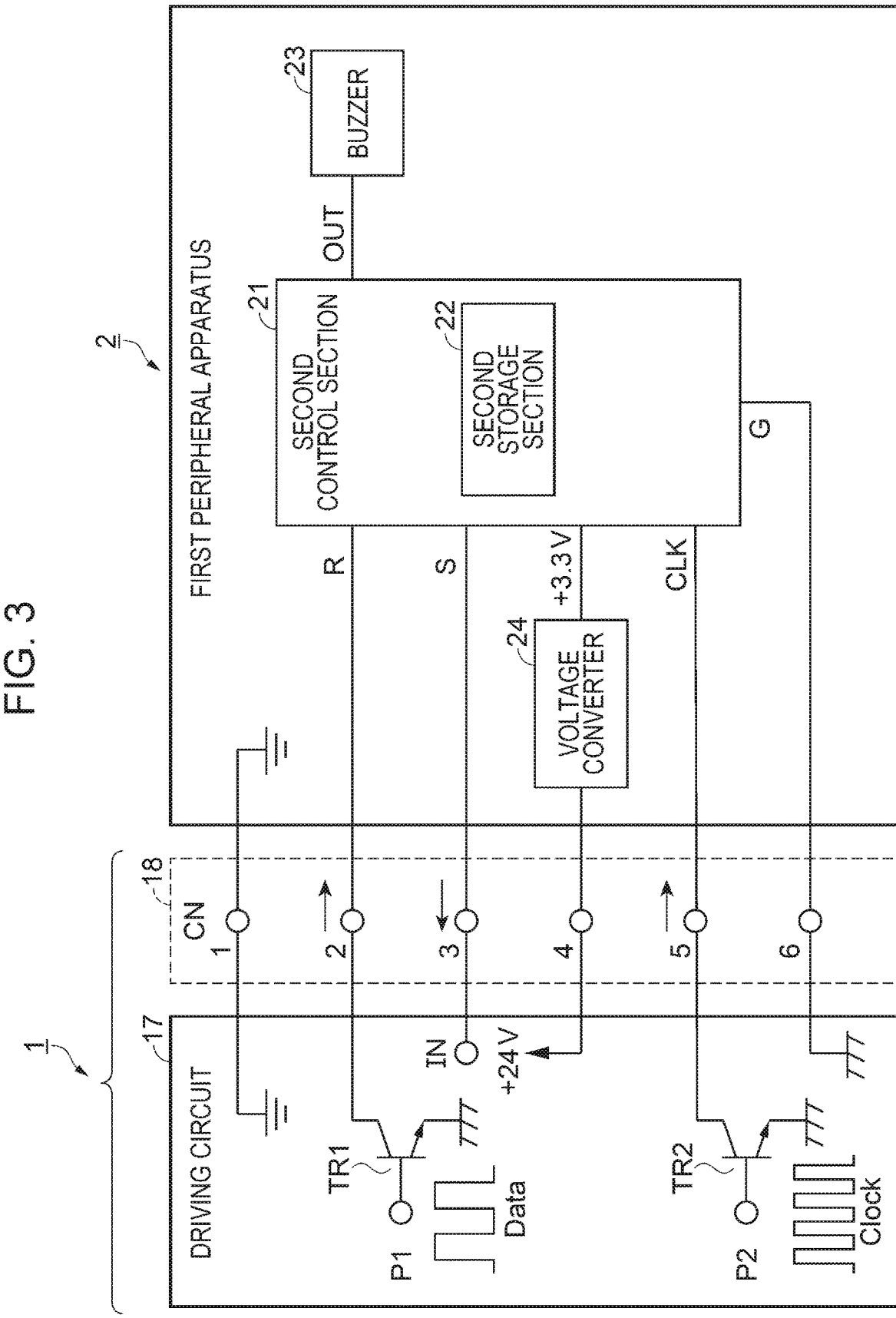
FIG. 3 is a circuit diagram illustrating the first peripheral apparatus and the main portion of the printing apparatus when the first peripheral apparatus is coupled.
Figure 10:
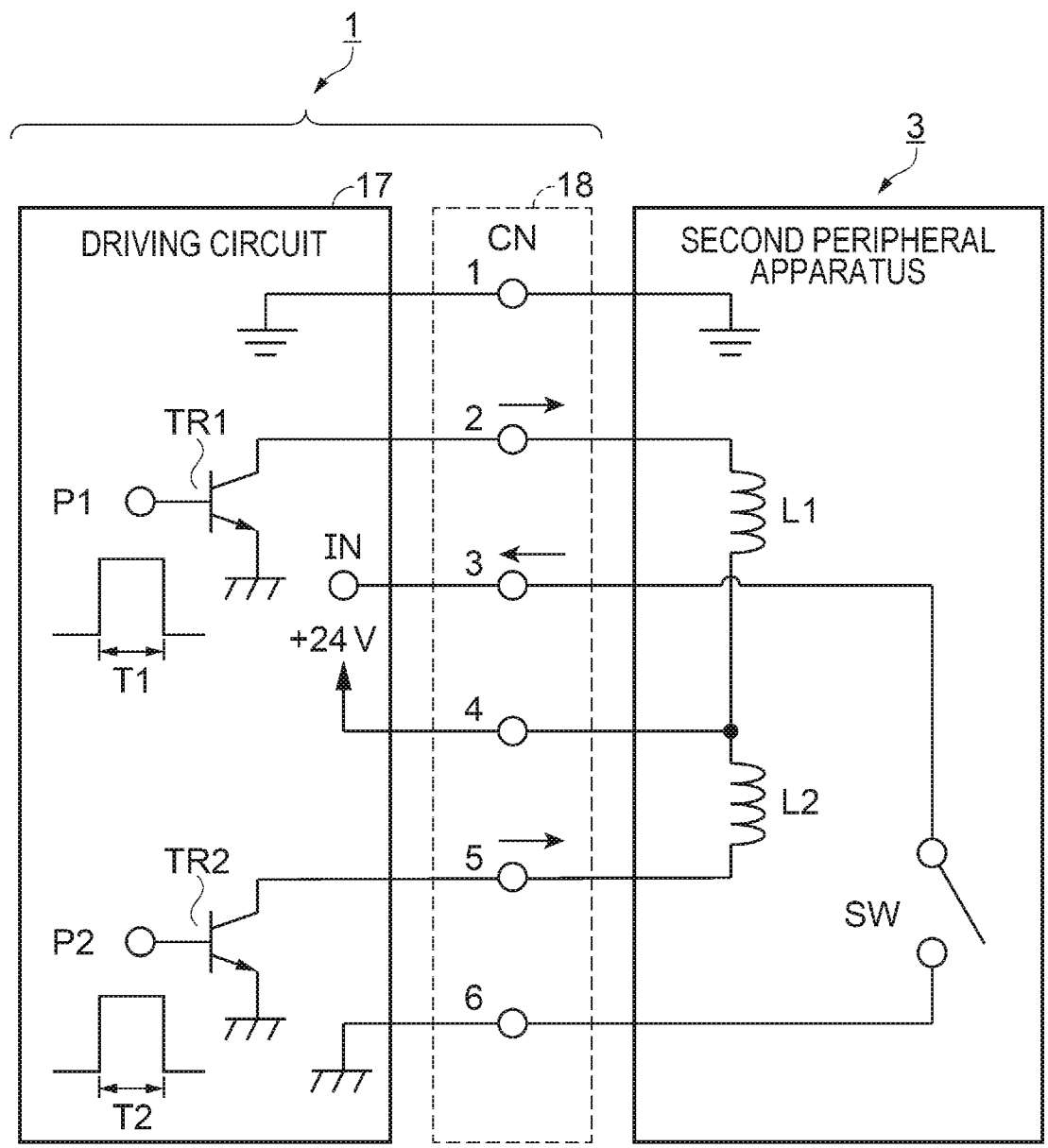
FIG. 10 is a circuit diagram illustrating a second peripheral apparatus and the main portion of the printing apparatus when the second peripheral apparatus is coupled.

FIG. 10 illustrates a case where the second peripheral apparatus 3 is coupled to the printing apparatus 1 instead of the first peripheral apparatus 2 illustrated in FIG. 3.

A configuration in which the printing apparatus 1 drives the second peripheral apparatus 3 will be described with reference to FIG. 10. The printing apparatus 1 is coupled to the second peripheral apparatus 3 via the CN 18 by a modular cable or the like.

The second peripheral apparatus 3 has a drawer (not illustrated), plungers L1 and L2, a hook (not illustrated), a spring (not illustrated), and a switch SW. The plungers L1 and L2 are actuators including an electromagnet and are coupled to the hook. The drawer is locked by the hook when closed. The drawer is configured to be locked by the hook when the staff pushes the drawer closed. The spring is then compressed by the closed drawer.

When the plungers L1 and L2 of the second peripheral apparatus 3 are driven, the hook locking the corresponding drawer is released, and the drawer is opened by the force of expansion of the spring. Hereinafter, driving the plungers L1 and L2 is also referred to as driving the second peripheral apparatus 3.

In a store, two staff members may use and manage individual drawers in the same second peripheral apparatus 3 respectively. Therefore, in this example, the second peripheral apparatus 3 has two drawers, and the plungers L1 and L2 are provided so as to correspond to the respective drawers.

In order to drive the plungers L1 and L2, for example, it is necessary to apply electric power of about 24 V and 1 A. The power supply 19 of the printing apparatus 1 has electric power capable of driving the plungers L1 and L2. Therefore, in the POS system, the second peripheral apparatus 3 is coupled to the printing apparatus 1.

In addition, since the second peripheral apparatus 3 is disposed near the printing apparatus 1, the staff of the store can give the receipt issued by the printing apparatus 1 to the customer, open/close the drawer of the second peripheral apparatus 3, and receive and give cash from and to the customer.

When the communication section 13 of the printing apparatus 1 receives a drive command for the second peripheral apparatus 3 from the external apparatus 4, the first control section 11 generates drive signals T1 and T2 for driving the plungers L1 and L2, and outputs the drive signals T1 and T2 from output ports P1 and P2. The drive signals T1 and T2 are signals having periods T1 and T2 of a high-level voltage respectively. The first control section 11 does not output the drive signals T1 and T2 at the same time, but outputs one of the drive signals T1 and T2 based on an instruction of the drive command for the second peripheral apparatus 3. The periods T1 and T2 are, for example, 100 msec to 200 msec.

The drive signals T1 and T2 output from the first control section 11 are respectively amplified by transistors TR1 and TR2 by using 24 V, and are transmitted from respective collectors to the second peripheral apparatus 3 via the terminals 2 and 5 of the CN 18.

The terminals 2 and 5 of the CN 18 are coupled to respective one ends of the respective plungers L1 and L2. The respective other ends of the plungers L1 and L2 are coupled to the terminal 4 of the CN 18, and 24 V is supplied from the printing apparatus 1.

The plungers L1 and L2 are driven by the drive signals T1 and T2 and can open the corresponding drawers. At this time, in the plungers L1 and L2, for example, a current of 1 A at 24 V flows over the period of 100 msec to 200 msec.

The terminal 1 of the CN 18 is coupled to respective grounds of the printing apparatus 1 and the second peripheral apparatus 3 to adjust the potential.

The switch SW is configured to be in an open state when one of the two drawers is opened, and to be in a closed state when both of the two drawers are closed.

One end of the switch SW is coupled to the ground level of the printing apparatus 1 via the terminal 6 of the CN 18.

The other end of the switch SW is coupled to the input port IN of the first control section 11 of the printing apparatus 1 via the terminal 3 of the CN 18.

The input port IN is pulled up to 3.3 V. Therefore, the first control section 11 can determine that the switch SW is in the open state when detecting 3.3 V, which is a high-level voltage, at the input port IN. That is, the first control section 11 can determine that one of the two drawers is open.

On the other hand, the first control section 11 can determine that the switch SW is in the closed state when the input port IN detects the ground level which is a low-level voltage. That is, the first control section 11 can determine that both of the two drawers are closed.

According to the above-described embodiment, the first control section 11 of the printing apparatus 1 receives the reception information, which is the transaction information including the plurality of pieces of print data and the plurality of cut commands, from the external apparatus 4 by the communication section 13. When there is no next reception for a predetermined period of time after receiving the reception information, the first control section 11 transmits a drive command to the first peripheral apparatus 2 via the CN 18 based on at least one cut command included in the reception information to drive the first peripheral apparatus 2. On the other hand, the first control section 11 does not transmit the drive command to the first peripheral apparatus 2 based on another cut command included in the reception information.

With this configuration, when the first peripheral apparatus 2 is a ringing apparatus, the printing apparatus 1 does not cause the first peripheral apparatus 2 to ring every time a slip is issued, and thus it is possible to prevent the staff from feeling annoyed.

Although the present embodiment is described in detail with reference to the drawings, the specific configuration is not limited to the embodiment, and changes, substitutions, deletions, and the like may be made without departing from the gist of the present disclosure.

The head 15a of the printing apparatus 1 is described using a line thermal head as an example, but the printing method is not limited. For example, an ink jet head may be used.

The first peripheral apparatus 2 may cause the buzzer 23 to ring in a self-excited manner or in a separately-excited manner.

The first peripheral apparatus 2 is described using a ringing apparatus as an example, but it may be a display apparatus. In addition, the second peripheral apparatus 3 is described using a cash drawer as an example, but it may be a change machine.

In the above-described embodiment, the first control section 11 of the printing apparatus 1 sets a flag when there is no reception in the communication section 13 and a predetermined period of time elapses. Instead of a flag, a memory switch may be set in a predetermined area of the first storage section 12, and the first control section 11 may write "1" in the memory switch based on a command designating "1" in the memory switch from the external apparatus 4 and perform the same process. In this case, the value may not be "1" and may be any value that can be identified by the first control section 11.

What is claimed is:

1. A printing apparatus comprising:
   a communication circuit configured to communicate with an external apparatus and receive print data and a cut command;
   a connector configured to be coupled to any one of a first peripheral apparatus and a second peripheral apparatus;
   a head configured to print the print data on recording paper;
   a cutter configured to cut the recording paper based on the cut command; and
   a controller configured to control the head and the cutter, wherein
   the controller is configured to
      after no reception for a predetermined period of time since the communication circuit has received information including a plurality of pieces of print data and a plurality of cut commands, transmit a drive command to the first peripheral apparatus via the connector based on at least one cut command among the cut commands included in the reception information to drive the first peripheral apparatus, and not transmit the drive command to the first peripheral apparatus based on another cut command.

2. The printing apparatus according to claim 1, further comprising:
   a roller configured to transport the recording paper, wherein
   the controller is configured to
      when there is no reception by the communication circuit for the predetermined period of time, after the recording paper is transported by a predetermined distance by the roller, cut the recording paper based on a last cut command included in the reception information.

3. The printing apparatus according to claim 2, wherein the predetermined distance is a distance between the head and the cutter.

4. The printing apparatus according to claim 1, wherein the one cut command is a first cut command included in the reception information.

5. The printing apparatus according to claim 1, wherein the connector is configured to be coupled to the second peripheral apparatus different from the first peripheral apparatus, and
   the controller is configured to generate a drive signal when a drive command for the second peripheral apparatus is received by the communication circuit, and transmit the drive signal to the second peripheral apparatus via the connector to drive the second peripheral apparatus.

6. The printing apparatus according to claim 5, wherein the first peripheral apparatus is a ringing apparatus, and the second peripheral apparatus is a cash drawer.

7. A method for controlling a printing apparatus, the apparatus including:
   a communication circuit configured to communicate with an external apparatus and receive print data and a cut command, a connector configured to be coupled to a first peripheral apparatus, a head configured to print the print data on recording paper, and a cutter configured to cut the recording paper based on the cut command, the method comprising:
   after no reception for a predetermined period of time since the communication circuit has received information including a plurality of pieces of print data and a plurality of cut commands, transmitting a drive command to the first peripheral apparatus via the connector based on one cut command among the cut commands included in the reception information to drive the first peripheral apparatus, and not transmitting the drive command to the first peripheral apparatus based on another cut command.

8. The printing apparatus according to claim 1, wherein the at least one cut command is last in the plurality of cut commands.

* * * * *